(12) United States Patent
Al Rasheed et al.

(10) Patent No.: US 9,322,535 B1
(45) Date of Patent: Apr. 26, 2016

(54) APPARATUS AND METHOD FOR PREVENTING PHOTOSENSITIVE EPILEPSY

(71) Applicants: Abdullah Khalid Al Rasheed, Riyadh (SA); Al-Yousif Nasser Mohammed, Riyadh (SA)

(72) Inventors: Abdullah Khalid Al Rasheed, Riyadh (SA); Al-Yousif Nasser Mohammed, Riyadh (SA)

( * ) Notice: Subject to any disclaimer, the term of this patent is extended or adjusted under 35 U.S.C. 154(b) by 97 days.

(21) Appl. No.: 14/261,511

(22) Filed: Apr. 25, 2014

(51) Int. Cl.
*F21V 21/084* (2006.01)
*G02C 11/04* (2006.01)

(52) U.S. Cl.
CPC .............. *F21V 21/084* (2013.01); *G02C 11/04* (2013.01)

(58) Field of Classification Search
CPC ....................................................... G02C 11/04
USPC ............................................................. 362/105
See application file for complete search history.

(56) References Cited

U.S. PATENT DOCUMENTS

| | | | |
|---|---|---|---|
| 6,350,275 B1 * | 2/2002 | Vreman ................. | A61M 21/00 607/88 |
| 6,824,265 B1 * | 11/2004 | Harper ................... | G02C 11/04 351/158 |
| 2006/0176442 A1 * | 8/2006 | Lee ......................... | G02C 11/04 351/51 |

* cited by examiner

*Primary Examiner* — Sean Gramling
(74) *Attorney, Agent, or Firm* — Ted Masters

(57) ABSTRACT

Apparatus and method for preventing photosensitive epilepsy in a user includes positioning light sources in front of the users eyes so that light from the light sources is directed toward the user's peripheral visual field of view. The light reduces the intensity difference between light received by the peripheral visual field of view and light received by the central visual field of view.

12 Claims, 7 Drawing Sheets

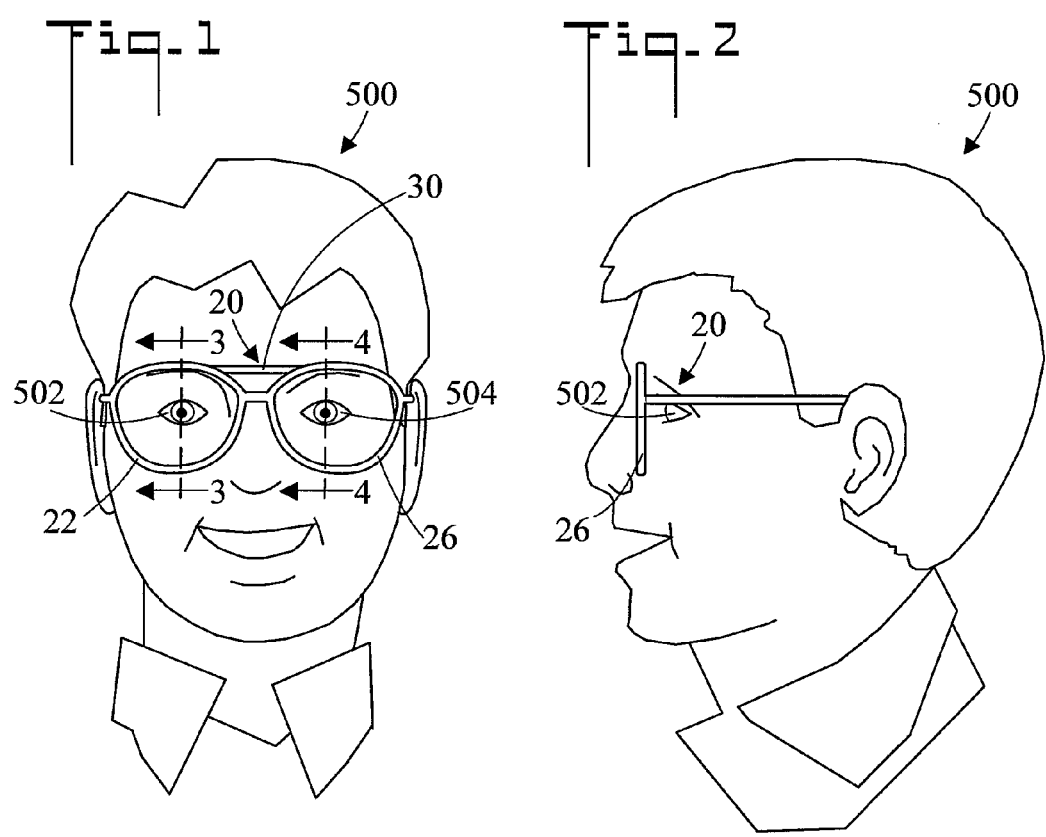

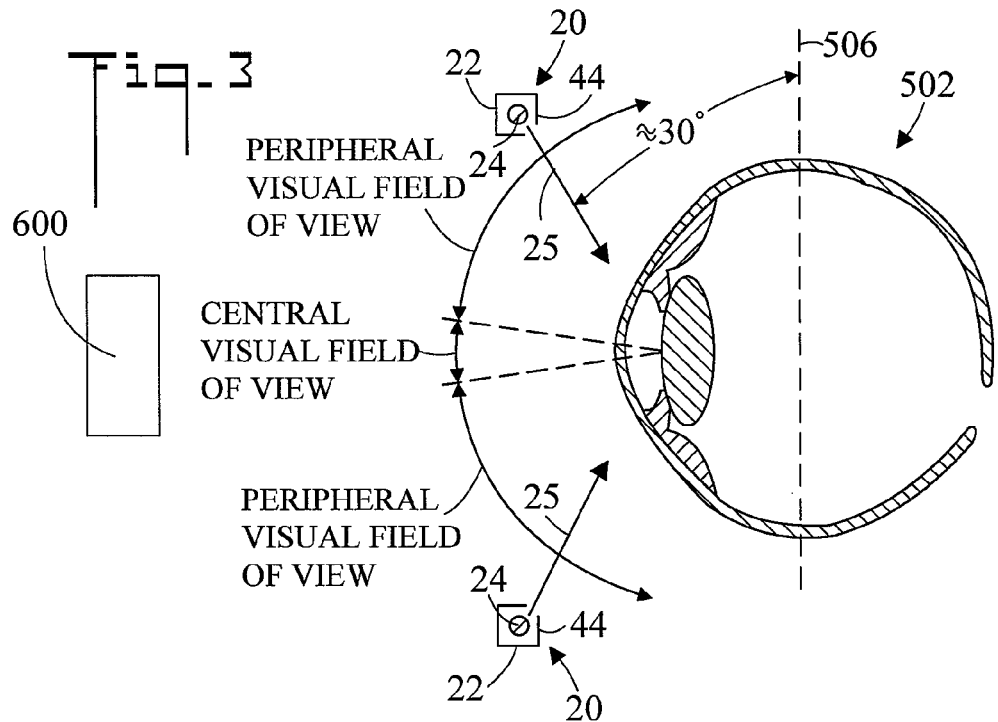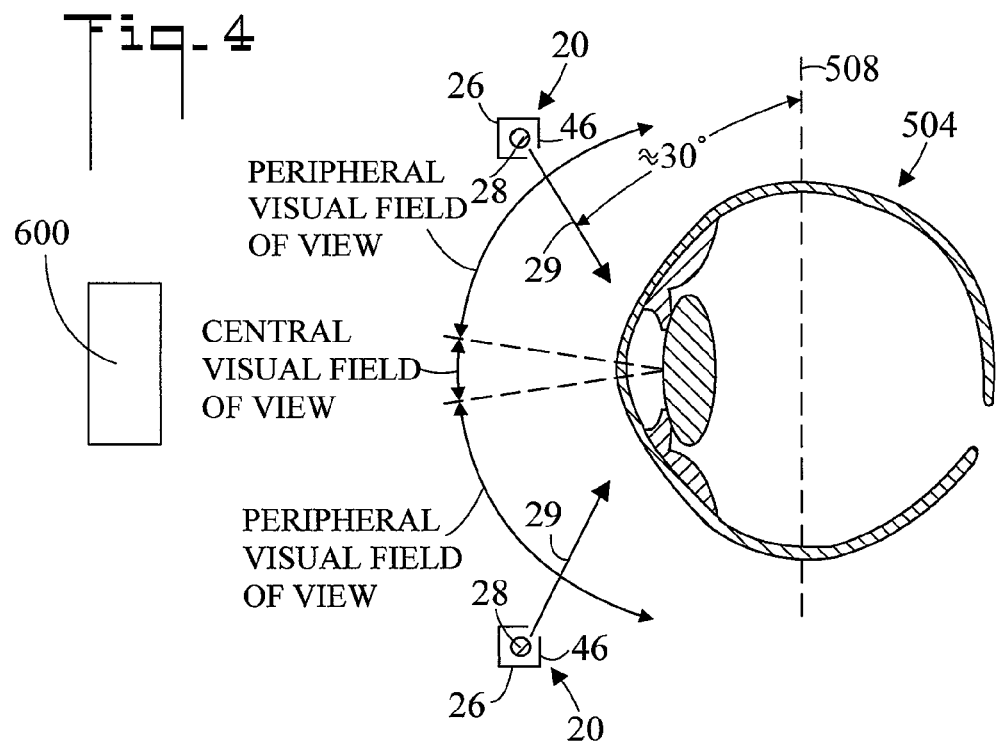

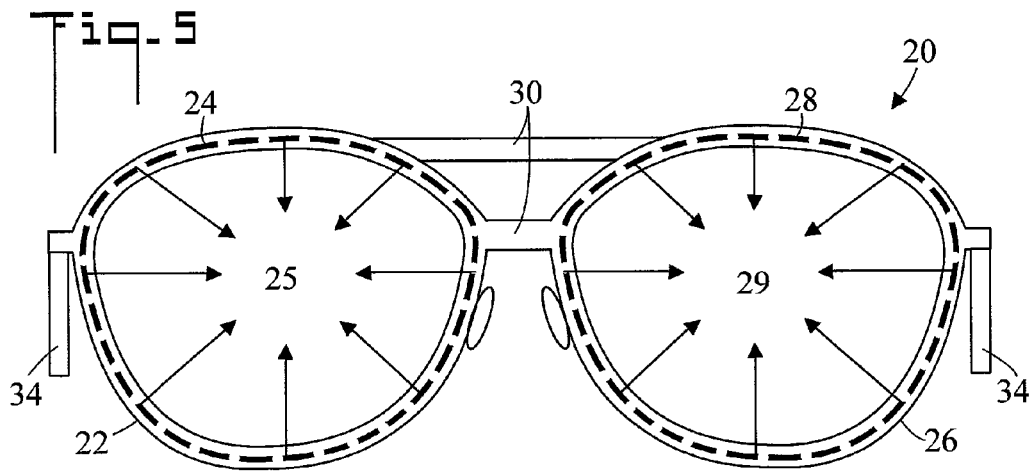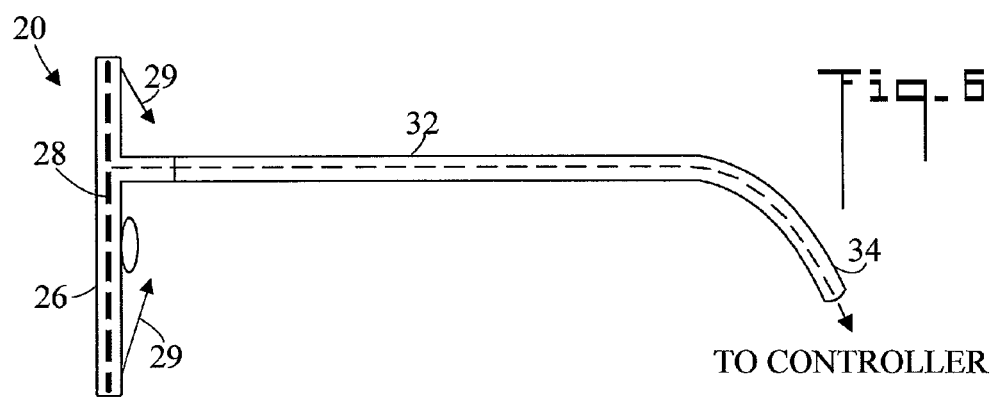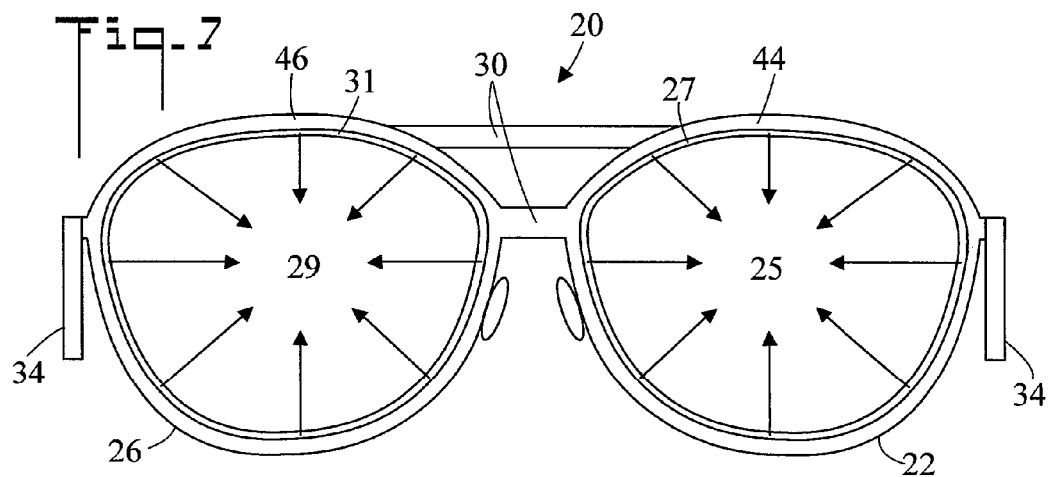

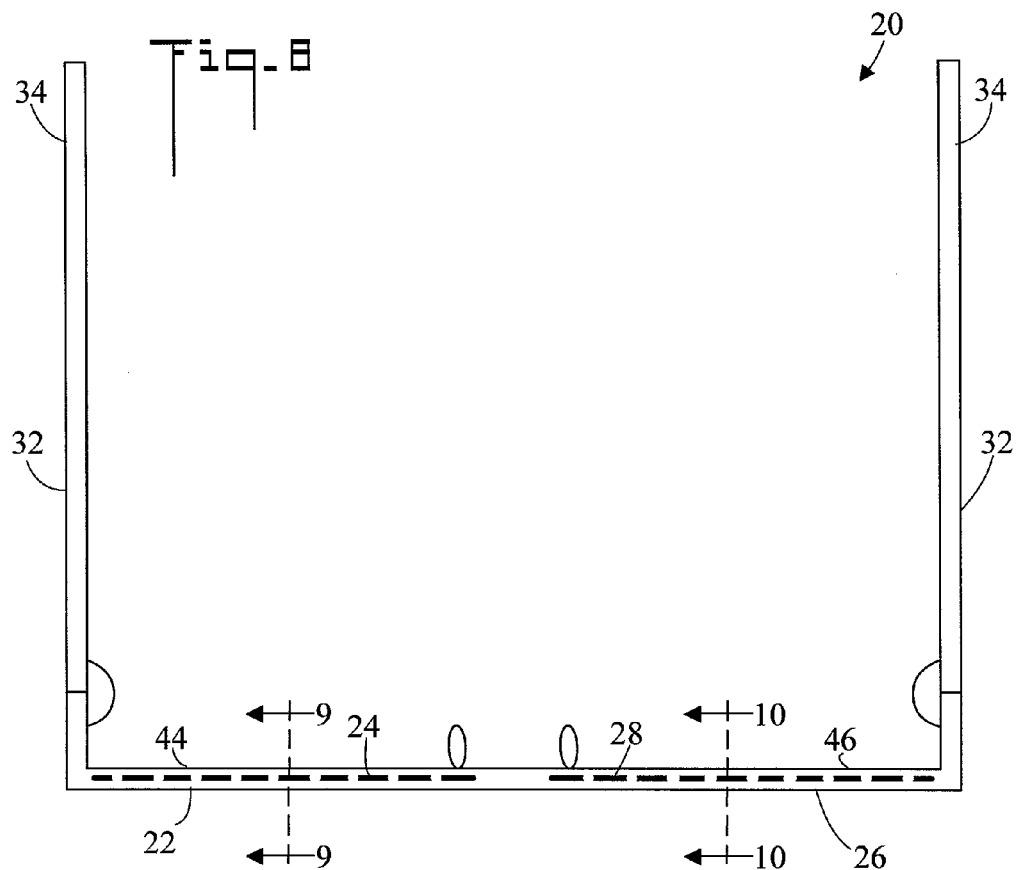
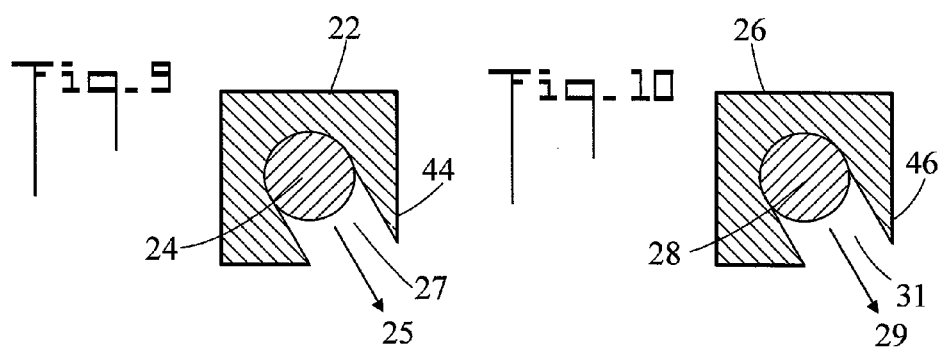

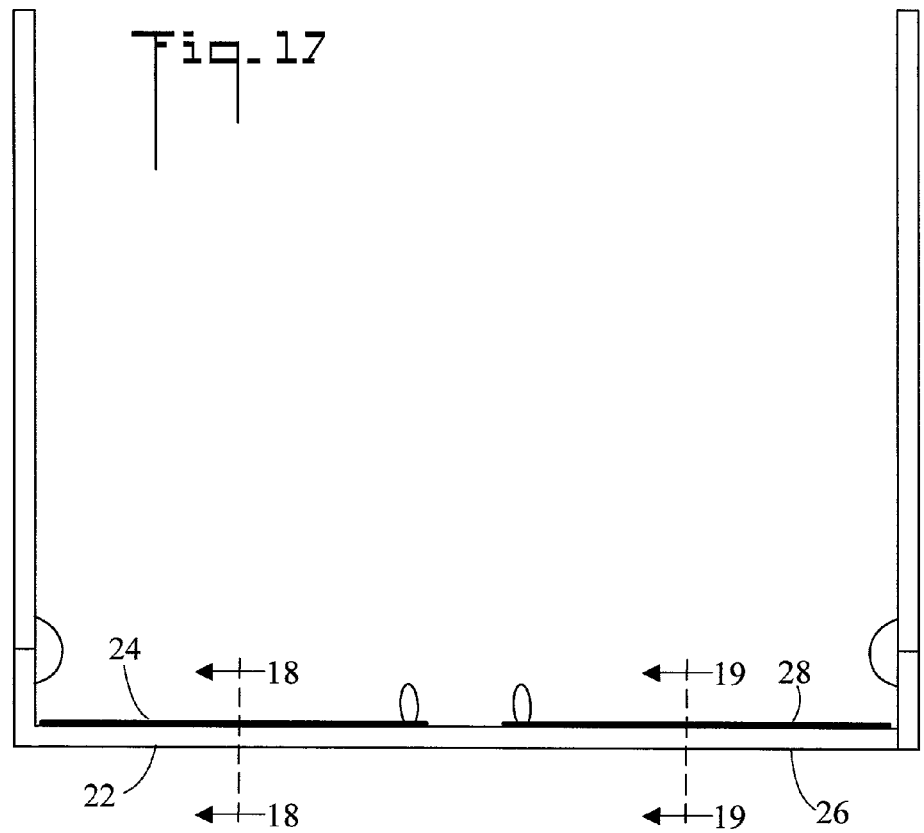
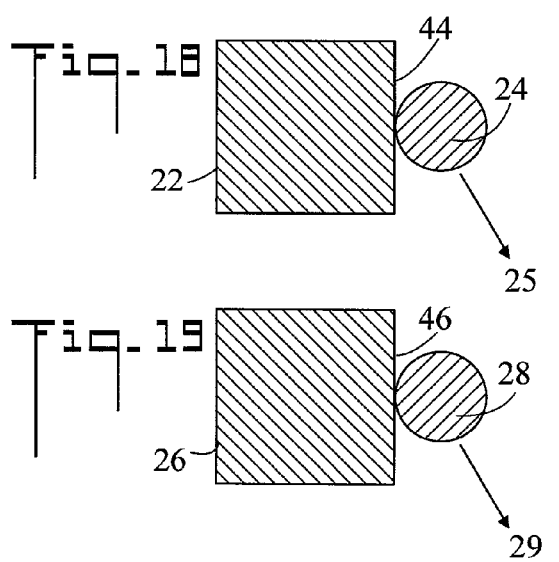
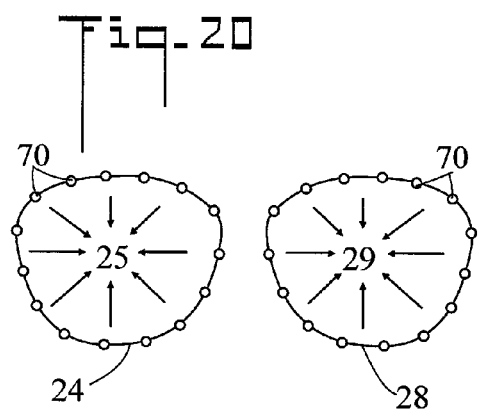

APPARATUS AND METHOD FOR PREVENTING PHOTOSENSITIVE EPILEPSY

CROSS REFERENCE TO RELATED APPLICATION

None

TECHNICAL FIELD

The present invention pertains generally to photosensitive epilepsy, and more particularly to apparatus and method for preventing same.

BACKGROUND OF THE INVENTION

Photosensitive epilepsy (PSE) is a physical disorder caused by visual stimuli. The visual stimuli typically includes patterns such as flashing lights and moving objects. These patterns can trigger epileptic seizures. For example, seizures in photosensitive people may be triggered by exposure to television screens due to the flicker or rolling images, to computer monitors, to certain video games or TV broadcasts containing rapid flashes or alternating patterns of different colors, and to intense strobe lights like visual fire alarms.[1]

People with epilepsy have a 2-14% chance of having seizures precipitated by light or pattern. In the Pokemon cartoon incident in Japan, 685 children visited a hospital in reaction to red-blue flashes on broadcast television[2]. Playing video games for extended period of time can cause children to experience many of the same symptoms seen in computer vision syndrome in adults. Extensive viewing of the game screen can lead to eye discomfort, fatigue, blurry vision and headaches. Kids seem to become so addicted to video games that they forget to take breaks. For epileptics even warning not to play video games it will not work.

LUMINANCE is what is measured by a light meter. It's an objective measurement. While BRIGHTNESS however a completely subjective is an attribute of light to which humans assign a label between very dim and very bright. Brightness is perceived, not measured.

The retina does not simply record light intensities. Rather, retinal responses depend on the surrounding context (center-surround receptive field):
1—Photoreceptor cell sensitivity depends on the average/ambient light intensity, due to light adaptation.
2—Retinal ganglion cell responses depend on the difference between light intensity in the center and that in the immediate surrounding.[3]

Simultaneous brightness contrast and simultaneous color contrast are classical illusions that demonstrate how our perception can be altered by spatial context. Typically, a gray stimulus placed on a bright background appears darker than the same gray stimulus placed on a dark background (e.g., Heinemann, 1955). This phenomenon, called simultaneous brightness contrast, clearly shows the importance of the surrounding luminance in brightness perception.[4]

High-contrast stimuli are more likely to provoke seizures than are bright lights against a light background.[5]

The intensity or brightness of the source of light and also the contrast between the light and dark parts during the flicker is also another important factor. If the contrast ratio is greater than 20 candelas/square meter, it poses a risk to the epileptic patients.[6]

Review of 12 video game programs in 30 subjects suggested that a "steady maximal brightness">100 lux was a key factor and could (in the presence of other stimuli characteristics) induce seizures in susceptible patients.[7]

Steady maximal brightness<50 was generally safe. By comparison, steady maximal brightness varied from 6 and 305 lux among video games.[2]

Both polarized lenses and tinted blue lenses claim to reduce or prevent photosensitive epilepsy by mechanism of anti-glare. Most photosensitive epileptics can prevent the photosensitive reaction by simply covering one eye (monocular vision). Active shutter glasses use the same mechanism to reduce photosensitive epilepsy. Unfortunately the PSE induced not only by glare but in addition by light brightness contrast, fast flashes and even by pattern, etc. In computer video games, the steady maximal brightness could reach 300 lux, and flash frequency could exceed more than 3 Hz which can be a good source to induce PSE caused by high brightness contrast and not because of glare.

It is known in the prior art that a well-lit room is more comfortable and causes less eye-strain when working on a computer screen. One of the recommendations of the Epilepsy Foundation of America, for photosensitive epileptics to keep the room well lit while working on electronic screens in general.[1] The background light will illuminate the peripheral visual field and this will lead to a reduction in contrast between the computer screen and the background light.

The well lit room light intensity is almost 500 lux near the light source, but will decline when it reach the peripheral vision say to 80 lux, while the computer screen light intensity more than 150 lux. Meanwhile the dim room light intensity reaching the eye is almost 10 lux and this is why the well lit room decreases the brightness contrast between peripheral and central vision.

BRIEF SUMMARY OF THE INVENTION

The present invention is directed to apparatus and method for preventing photosensitive epilepsy (PSE) in a user. This is accomplished by positioning light sources in front of the users eyes so that light from the light sources is directed toward the user's peripheral visual field of view. The light reduces the intensity difference (contrast) between light received by the peripheral visual field of view and light received by the central visual field of view. The lower contrast lessens the triggers which induce photosensitive seizures. The apparatus and method also decreases eye strain and headaches for users who operate devices having screens. The apparatus and method are particularly useful in preventing PSE in individual who play computer video games.

In accordance with an embodiment, apparatus is disclosed for preventing photosensitive epilepsy in a user having a right eye which has a right peripheral visual field of view and a left eye which has a left peripheral visual field of view. The apparatus includes a first rim. A first light source which emits light is carried by the first rim. The apparatus further includes a second rim. A second light source which emits light is carried by the second rim. The first and second rims are positionable on the user so that the user's right eye looks through the first rim and the light from the first light source is directed toward the right peripheral visual field of view of the user, and the user's left eye looks through the second rim and the light from the second light source is directed toward the left peripheral visual field of view of the user.

In accordance with another embodiment, the first and second light sources are each electroluminescent wires.

In accordance with another embodiment, the first and second light sources each include a plurality of discrete light sources.

In accordance with another embodiment, the first light source is embedded within the first rim, and the second light source is embedded within the second rim.

In accordance with another embodiment, the first rim has a first light channel which passes light from the first light source, and the second rim has a second light channel which passes light from the second light source.

In accordance with another embodiment, the first rim has a first rear side, the light from the first light source is directed toward the first rear side of the first rim, and the second rim has a second rear side, the light from the second light source is directed toward the second rear side of the second rim.

In accordance with another embodiment, the first and second rims are fabricated from a polymer.

In accordance with another embodiment, the first light source is disposed external to the first rim, and the second light source is disposed external to the second rim.

In accordance with another embodiment, the right eye has a first axis and the left eye has a second axis. Light from the first light source forms an angle of about 30° with the first axis, and light from the second light source forms an angle of about 30° with the second axis. In accordance with another embodiment, when the first and second rims are oriented vertically, the light from the first and second light sources forms an angle of about 30° with the vertical.

In accordance with another embodiment, the first and second rims do not carry eyeglass.

In accordance with another embodiment, an intensity control controls the intensity of the light emitted by the first and second light sources.

Other embodiments, in addition to the embodiments enumerated above, will become apparent from the following detailed description, taken in conjunction with the accompanying drawings, which illustrate, by way of example, the principles of the apparatus and method for preventing photosensitive epilepsy.

BRIEF DESCRIPTION OF THE DRAWINGS

FIG. 1 is a reduced front elevation view of apparatus for preventing photosensitive epilepsy being worn be a user;

FIG. 2 is a side elevation view of the apparatus being worn by a user;

FIG. 3 is an enlarged cross sectional view along the line 3-3 of FIG. 1;

FIG. 4 is an enlarged cross sectional view along the line 4-4 of FIG. 1;

FIG. 5 is a front elevation view of the apparatus;

FIG. 6 is a side elevation view of the apparatus;

FIG. 7 is a rear elevation view of the apparatus;

FIG. 8 is a top plan view of the apparatus;

FIG. 9 is an enlarged cross sectional view along the line 9-9 of FIG. 8;

FIG. 10 is an enlarged cross sectional view along the line 10-10 of FIG. 8

FIG. 17 is a top plan view of an embodiment with an external light source;

FIG. 18 is a cross sectional view along the line 18-18 of FIG. 17;

FIG. 19 is a cross sectional view along the line 19-19 of FIG. 17; and,

FIG. 20 is a reduced front elevation view of a different light source.

DETAILED DESCRIPTION OF THE INVENTION

Figure 11:
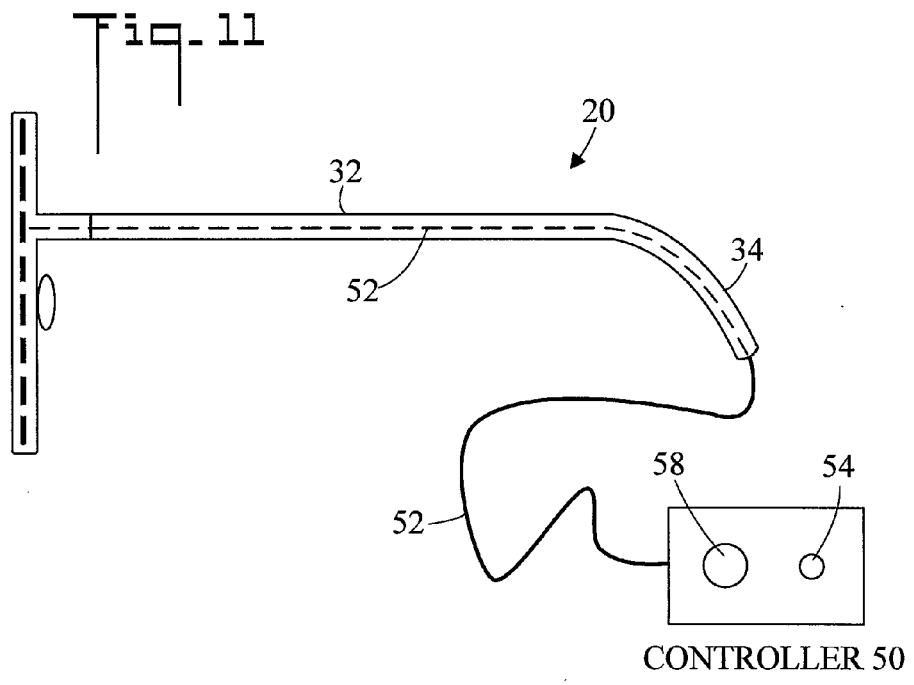
FIG. 11 is a side elevation view of the apparatus and a controller.

Referring initially to FIGS. 1-2, there are illustrated reduced front and side elevation views respectively of apparatus for preventing photosensitive epilepsy being worn be a user, the apparatus generally designated as 20 and the user designated as 500. FIGS. 3-4 are enlarged cross sectional views along the lines 3-3 and 4-4 respectively of FIG. 1. User 500 has a right eye 502 which has a right peripheral visual field of view and a left eye 504 which has a left peripheral visual field of view. Apparatus 20 includes a first rim 22. A first light source 24 which emits light 25 is carried by first rim 22. That is, first light source 24 is in some fashion attached to rim 22. Apparatus 20 further includes a second rim 26. A second light source 28 which emits light 29 is carried by second rim 26. First 22 and second 24 rims are positionable on the user 500 so that the user's right eye 502 looks through first rim 22 and the light 25 from first light source 24 is directed toward the right peripheral visual field of view of the user 500, and the user's left eye 504 looks through second rim 26 and the light 29 from second light source 28 is directed toward the left peripheral visual field of view of the user 500. The light 25 and 29 is received by the peripheral visual fields of right eye 502 and left eye 504 respectively, decreases the contrast between the central visual field of view and the peripheral visual field of view, and thereby prevents PSE events. In an embodiment, right eye 502 has a first axis 506 and left eye 504 has a second axis 508. Axes 506 and 508 are perpendicular to the center of the central visual field of view. Light 25 from first light source 24 forms an angle of about 30° with first axis 506, and light 29 from second light source 28 forms an angle of about 30° with second axis 508. In FIGS. 3 and 4, it is noted that light from first light source 24 is directed toward the right peripheral visual field of view but not toward the right central visual field of view, and light from second light source 28 is directed toward the left peripheral visual field of view but not toward the left central visual filed of view. First light source 24 reduces an intensity difference between light received by the right peripheral visual field of view and light received by the right central visual field of view, and second light source 28 reduces an intensity difference between light received by the left peripheral visual field of view and light received by the left central visual field of view. The reductions in intensity difference prevent photosensitive epilepsy. In FIGS. 3 and 4 it is further noted that a device 600 which can cause photosensitive epilepsy is disposed in front of the user so that both the right and left eyes of the user look through their respective rims and at the device.

FIGS. 5-8 are front elevation, side elevation, rear elevation, and top plan views respectively of apparatus 20. FIG. 9 is an enlarged cross sectional view along the line 9-9 of FIG. 8. In the shown embodiment, apparatus 20 takes the general form of a pair of reading glasses which can be worn by a user. To that end, first rim 22 is connected to second rim 26 by a bridge 30 which holds rims 22 in spaced apart relationship and which rests upon the nose of the user, and temples 32 having end ear pieces 34 to effect connection to the user, all in the conventional manner. However, it is noted that contrary to conventional reading glasses, rims 22 and 26 may or may not carry eyeglass (lenses). For a user who requires corrective lenses, such eyeglass can be attached to rims 22 and 26. On the other hand, users who do not require corrective lens or users who wear contact lenses, can use apparatus 20 without eyeglass being included and carried by rims 22 and 26.

In the shown embodiment, first 24 and second 28 light sources are each electroluminescent wires which emit a constant non-flashing light (shown in bold dashed lines in FIGS. 5, 6, and 8). When apparatus 20 is worn (as in FIGS. 1 and 2), the electroluminescent wires essentially surround the eyes of the user, thereby directing light around the entire peripheral visual field of view of the user. It may be appreciated however that other light sources could also be utilized (refer to FIG. 20 and the associated discussion). Also in the shown embodiment, rims 22 and 26 are rounded such as those found in conventional eyeglasses, however rims 22 and 26 can also be of different shapes such as more rectangular, circular, etc.

Referring specifically to FIGS. 8, 9, and 10, first light source 24 is embedded within first rim 22, and second light source 28 is embedded within second rim 26. Embedded means that first light source 24 and second light source 28 are disposed within first rim 22 and second rim 26 respectively, and are totally or partially surrounded by the rims. First rim 22 has a first light channel 27 which passes light 25 from said first light source 24. Similarly, second rim 26 has a second light channel 31 which passes light 29 from second light source 28. In the shown embodiment, first 24 and second 28 light sources are electrolumininescent wire which is contained within rims 22 and 26 respectively so that the wire surrounds or partially surrounds the eye of the user (when viewed from the front as in FIGS. 1 and 5). In the shown embodiment, first rim 22 has a first rear side 44, light 25 from first light source 24 is directed toward first rear side 44 of first rim 22. Similarly, second rim 26 has a second rear side 46, light 29 from second light source 28 is directed toward second rear side 46 of second rim 26. That is, light 25 and 29 is directed back toward the eyes of the user when apparatus 20 is worn as is shown in FIGS. 3 and 4.

In an embodiment, first 22 and second 26 rims are fabricated from a polymer. However, it may be appreciated that that other materials such as metal, synthetics, wood, etc. could also be utilized.

FIG. 11 is a side elevation view of apparatus 20 and a controller 50. Controller 50 contains the circuitry for driving and controlling apparatus 20. Controller 50 is connected to electroluminescent wire 24 and 28 by a wire 52 which runs inside or along ear piece 34 and temple 32. Referring also to FIG. 11, controller 50 contains an ON/OFF switch 54, an EL wire driver circuit 56 (such as an inverter), a light intensity control 58, and a power supply 60 (such as batteries). Intensity control 58 (such as a variable resistor) allows the user to control the intensity of the light emitted by the first 24 and second 28 light sources.

Figure 12:
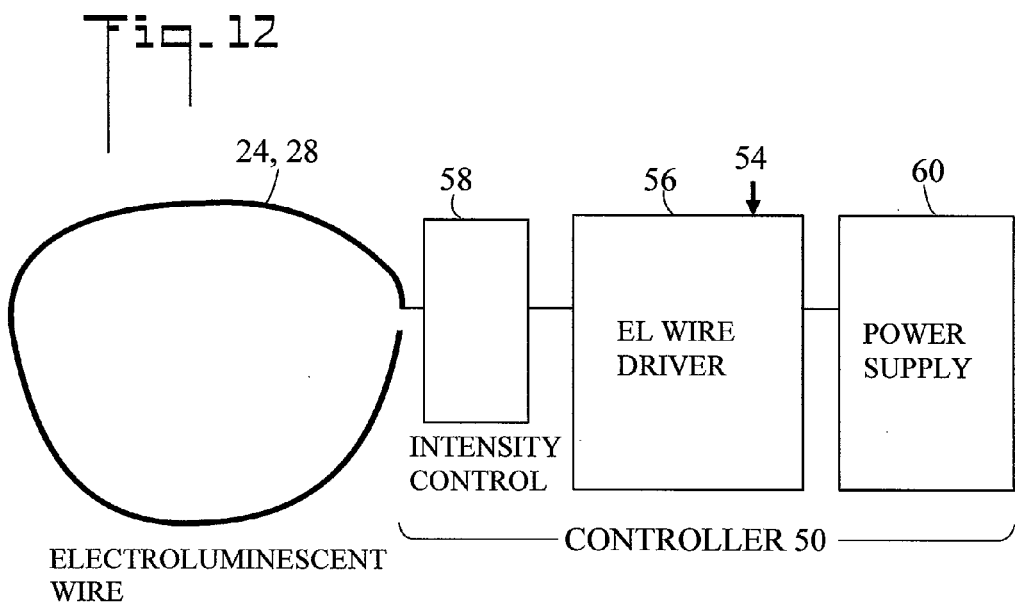
FIG. 12 is a simplified functional diagram of the apparatus.

FIG. 12 is a simplified functional diagram of apparatus 20 showing electroluminescent wire 24 and 28, and controller 50 including an ON/OFF switch 54, an EL wire driver circuit 56, light intensity control 58, and power supply 60.

Figure 13:
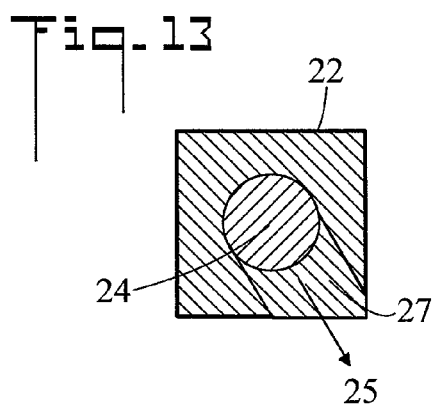
FIG. 13 is an enlarged cross sectional view as in FIG. 9 of another way of embedding a light source in the rims.

FIGS. 13-16 disclose different ways of embedding the light source in the rim. It may be appreciated that other ways could also be used. FIG. 13 is an enlarged cross sectional view as in FIG. 9 of another way of embedding first light source 24 in first rim 22. It is noted that second light source 28 could similarly be embedded in second rim 26 (also in FIGS. 14-16). In this embodiment, rim 22 is fabricated from an opaque material (such as a polymer), and first light channel 27 is fabricated from a transparent material (such as a clear polymer) which transmits light 25.

Figure 14:
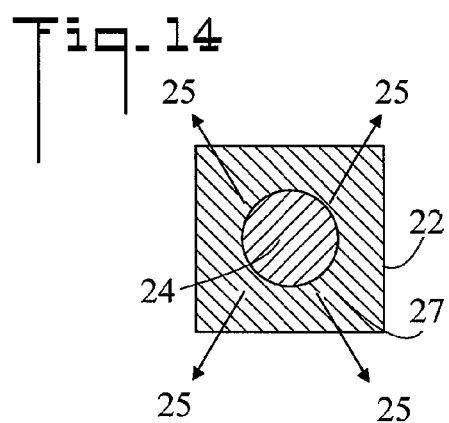
FIG. 14 is an enlarged cross sectional view as in FIG. 9 of another way of embedding the light source in the rims.

FIG. 14 is an enlarged cross sectional view as in FIG. 9 of another way of embedding first light source 24 in first rim 22. In this embodiment, first rim 22 is fabricated from a transparent material, and as such light 25 from light source 24 emanates in all directions from first rim 22.

Figure 15:
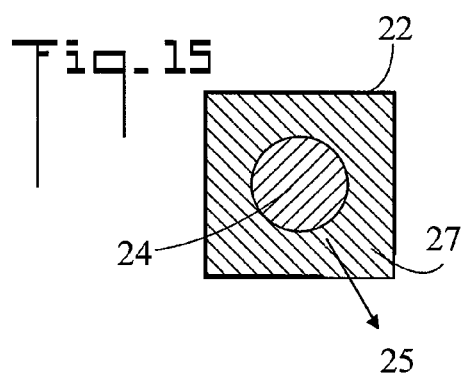
FIG. 15 is an enlarged cross sectional view as in FIG. 9 of another way of embedding the light source in the rims.

FIG. 15 is an enlarged cross sectional view as in FIG. 9 of another way of embedding first light source 24 in first rim 22. In this embodiment rim 22 is fabricated from a transparent material which has an opaque coating 21. Light 25 passes through first light channel 27 which includes an opening in opaque coating 21.

Figure 16:
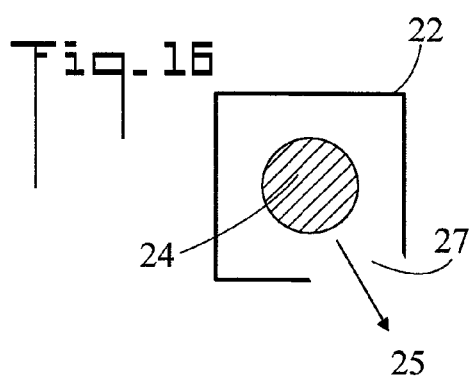
FIG. 16 is an enlarged cross sectional view as in FIG. 9 of another way of embedding the light source in the rims.

FIG. 16 is an enlarged cross sectional view as in FIG. 9 of another way of embedding first light source 24 in first rim 22. In this embodiment first rim 22 is a hollow shell and light 25 from first light source 24 escapes through first light channel 27 which includes a slit in first rim 22.

FIG. 17 is a top plan view of an embodiment with an external light source, and FIGS. 18 and 19 are cross sectional views along the lines 18-18 and 19-19 of FIG. 17 respectively. In this embodiment first light source 24 disposed external to first rim 22, and second light source 28 disposed external to second rim 26. First light source 24 is connected to first rear side 44 of first rim 22, and second light source 28 is connected to second rear side 46 of second rim 26.

FIG. 20 is a reduced front elevation view of a different light source. Light sources 24 and 28 are not the previously shown electroluminescent wire, but rather consists of a plurality of discrete light sources 70 (such as LEDs) which when worn will surround the eye of the user. Moreover, it is noted that rims are not necessarily required to practice apparatus 20. In other embodiments the light source can be placed around the eye of the user without a supporting rim. For example a strand of electroluminescent wire or a curved light bulb could be utilized without any supporting structure.

In an embodiment, the light intensity produced by apparatus 20 should simulate that which would reach the eye of the user in a well lit room (about 50-100 lux). The light intensity in a well lit room is about 500 lux, however the peripheral visual field of view of the eye will receive only about 50-100 lux depending on the distance between the light source and the eye.

The light sources preferably emit continuous white light, similar to the light from a computer monitor, without any flashes or other changes in intensity. Also, the light sources should not radiate a large amount of heat which could irritate the eye. In one embodiment the rims should have a thickness around the eye of at least 3 mm to provide heat isolation.

The illuminated frame is safe to wear and less likely to induce seizure by itself since it has a light intensity of 50-100 lux and does not flash. In addition, the light falls on the peripheral visual field of view which has less brain cortex representation than central vision. Since 90% of neurons in the visual cortex are known to subserve central vision[8]. Therefore, the eye focus (the macula) is supposed to be away from the light. So wearing the illuminated glasses while playing video game will enlighten the peripheral vision and accordingly will minimize the contrast of video game. Therefore apparatus 20 will reduce or even prevent the triggering factor for PSE. However, it is noted that apparatus 20 should not be used when performing other tasks such as driving, since it could obliterate the peripheral visual field.

In terms of use, a method for preventing photosensitive epilepsy in a user 500 having a right eye 502 which has a right peripheral visual field of view and a left eye 504 which has a left peripheral visual field of view, includes: (refer to FIGS. 1-20)

(a) providing a first light source 24 which emits light 25 and a second light source 28 which emits light 29;

(b) positioning first light source 24 slightly in front of the right eye 502 so that light 25 from first light source 24 is directed toward the right peripheral visual field of view; and, (c) positioning second light source 28 slightly in front of the left eye 504 so that light 29 from second light source 28 is directed toward the left peripheral visual field of view.

The method further including:
in (a), first 24 and second 28 light sources each being electroluminescent wires.

The method further including:
in (a) the first 24 and second 28 light sources each including a plurality of discrete light sources.

The method further including:
in (a), the first light source 24 carried by a first rim 22;
in (a), the second light source 28 carried by a second rim 26;
in (b), the positioning including causing the right eye 502 to look though the first rim 22; and,
in (c), the positioning including causing the left eye 504 to look through the second rim 26.

The method further including:
the first light source 24 embedded within the first rim 22; and,
the second light source 28 embedded within the second rim 26.

The method further including:
the first light source 24 disposed external to the first rim 22; and,
the second light source 28 disposed external to the second rim 26.

The method further including:
in (a), the first 22 and second rims 26 not carrying eyeglass.

The method further including:
providing an intensity control 58 for controlling the intensity of the light emitted by the first 24 and second 28 light sources.

LIST OF REFERENCES

1—Photosensitivity and Seizures (epilepsy foundation of America)
www.epilepsyfoundation.org
2—Epilepsia. 2005 September; 46(9):1426-41.
Photic- and pattern-induced seizures: a review for the Epilepsy Foundation of America Working Group. Fisher R S, Harding G, Erba G, Barkley G L, Wilkins A.
3—Perception 30 Lecture Notes: Brightness
Copyright © 2006, Department of Psychology, New York University. Professor David Heeger.
4—J Vis. 2012 Nov. 1; 12(12). pii: 1. doi: 10.1167/12.12.1.
Flashed stimulation produces strong simultaneous brightness and color contrast. Kaneko S, Murakami I.
5—Hiachikawa Y, Yamamoto J, Furuya E, et al. Photosensitive epilepsy: relationships between the visual evoked responses and the epileptic formed discharges induced by intermittent photo stimulation. Electroencephalogr Clin Neurophysiol 1967; 23: 320-34.
6—Epilepsia. 2005 August; 46(8):1212-8.
Characterizing the patterned images that precipitate seizures and optimizing guidelines to prevent them. Wilkins A[1], Emmett J, Harding G.
7—Epilepsia. 1999; 40 Suppl 4:31-7.
The effect of video-game software in video-game epilepsy. Ricci S, Vigevano F.
8—Drasdo N. The neural representation of visual space. Nature 1997; 266:554-6.

The embodiments of the apparatus and method for preventing photosensitive epilepsy described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is defined by the appended claims.

We claim:

1. Apparatus for preventing photosensitive epilepsy in a user having a right eye which has a right peripheral visual field of view and a right central visual field of view, and a left eye which has a left peripheral visual field of view and a left central visual field of view, the apparatus comprising:
a first rim;
a first light source which emits light carried by said first rim;
a second rim;
a second light source which emits light carried by said second rim;
said first and second rims positionable on the user so that the user's right eye looks through said first rim and said light from said first light source is directed toward the right peripheral visual field of view but not toward the right central visual field of view, and the user's left eye looks through said second rim and said light from said second light source is directed toward the left peripheral visual field of view but not toward the left central visual filed of view;
wherein said first light source reduces an intensity difference between light received by the right peripheral visual field of view and light received by the right central visual field of view, and said second light source reduces an intensity difference between light received by the left peripheral visual field of view and light received by the left central visual field of view; and,
said reductions in intensity difference preventing photosensitive epilepsy.

2. The apparatus according to claim 1, further including:
said first and second light sources each being electroluminescent wires.

3. The apparatus according to claim 1, further including:
said first light source disposed around said first rim so that said first light source surrounds the right eye; and,
said second light source disposed around said second rim so that said second light source surrounds the left eye.

4. The apparatus according to claim 1, further including:
said first light source and said second light source each having an intensity of about 50-100 lux.

5. The apparatus according to claim 1, the right eye having a first axis and the left eye having a second axis, the apparatus further including:
said light from said first light source forming an angle of about 30° with said first axis; and,
said light from said second light source forming an angle of about 30° with said second axis.

6. The apparatus according to claim 1, the right eye having a first axis and the left eye having a second axis, the apparatus further including:

said first light source carried by a first rim and said second light source carried by a second rim;

said first and second light sources each being electroluminescent wires;

said first light source disposed around said first rim so that said first light source surrounds the right eye;

said second light source disposed around said second rim so that said second light source surrounds the left eye;

said first light source and said second light source each having an intensity of about 50-100 lux;

said light from said first light source forming an angle of about 30° with said first axis; and, said light from said second light source forming an angle of about 30° with said second axis.

7. A method for preventing photosensitive epilepsy in a user having a right eye which has a right peripheral visual field of view and a right central visual field of view, and a left eye which has a left peripheral visual field of view and a left central visual field of view, the method comprising:

(a) providing a device which can cause photosensitive epilepsy;

(b) providing a first light source which emits light and a second light source which emits light;

(c) positioning said first light source slightly in front of the right eye so that said light from said first light source is directed toward the right peripheral visual field of view but not toward the right central visual field of view, said positioning including causing the right eye to look at said device;

(d) positioning said second light source slightly in front of the left eye so that said light from said second light source is directed toward the left peripheral visual field of view but not toward the left central visual field of view, said positioning including causing the left eye to look at said device; and, in (c), said first light source reducing an intensity difference between light received by the right peripheral visual field of view and light received by the right central visual field of view, and in (d), said second light source reducing an intensity difference between light received by the left peripheral visual field of view and light received by the left central visual field of view, said reductions in intensity difference preventing photosensitive epilepsy.

8. The method of claim 7, further including:

in (a), said device being a screen upon which video games are played.

9. The method of claim 7, further including:

in (b), said first light source carried by a first rim and said second light source carried by a second rim;

in (b), said first light source disposed around said first rim so that said first light source surrounds the right eye; and, in (b), said second light source disposed around said second rim so that said second light source surrounds the left eye.

10. The method of claim 7, further including:

in (b), said first and second light sources each being electroluminescent wires.

11. The method of claim 7, further including:

in (b) said first light source and said second light source each having an intensity of about 50-100 lux.

12. The method according to claim 7, the right eye having a first axis and the left eye having a second axis, the method further including:

in (c), said light from said first light source forming an angle of about 30° with said first axis; and, in (d), said light from said second light source forming an angle of about 30° with said second axis.

\* \* \* \* \*

UNITED STATES PATENT AND TRADEMARK OFFICE
CERTIFICATE OF CORRECTION

| | |
|---|---|
| PATENT NO. | : 9,322,535 B1 |
| APPLICATION NO. | : 14/261511 |
| DATED | : April 26, 2016 |
| INVENTOR(S) | : Abdullah Khalid Al Rasheed et al. |

It is certified that error appears in the above-identified patent and that said Letters Patent is hereby corrected as shown below:

On the title page under Applicants: change "Al-Yousif Nasser Mohammed" to --Nasser Mohammed Al-Yousif--

On the title page under Inventors: change "Al-Yousif Nasser Mohammed" to --Nasser Mohammed Al-Yousif--

Signed and Sealed this
Twenty-eighth Day of June, 2016

Michelle K. Lee
*Director of the United States Patent and Trademark Office*